United States Patent [19]
Edwards

[11] Patent Number: 6,116,114
[45] Date of Patent: Sep. 12, 2000

[54] ROTATABLE SPINDLE ASSEMBLY UTILIZING TWO-PIECE SPINDLE

[76] Inventor: Craig H. Edwards, 3460 Ocean View Blvd., Suite D, Glendale, Calif. 91208

[21] Appl. No.: 08/599,474

[22] Filed: Jan. 23, 1996

Related U.S. Application Data

[63] Continuation-in-part of application No. 08/109,966, Aug. 23, 1993, Pat. No. 5,493,937.

[51] Int. Cl.[7] ........................................ G05G 1/14
[52] U.S. Cl. ........................ 74/594.1; 74/594.2; 280/259; 384/545
[58] Field of Search ............................... 74/594.1, 594.2; 280/259, 281.1; 384/537, 545, 626

[56] References Cited

U.S. PATENT DOCUMENTS

| | | |
|---|---|---|
| 568,082 | 9/1896 | Barnes et al. . |
| 593,471 | 11/1897 | Heaton . |
| 596,846 | 1/1898 | Brown .................... 74/594.2 |
| 602,016 | 4/1898 | Johnson . |
| 615,868 | 12/1898 | Marbach . |
| 622,644 | 4/1899 | Annable . |
| 623,373 | 4/1899 | Jerome . |
| 627,597 | 6/1899 | Scott . |
| 648,077 | 4/1900 | Ludlow . |
| 650,412 | 5/1900 | McLellan . |
| 667,232 | 2/1901 | Leaycraft . |
| 757,154 | 4/1904 | Tate . |
| 774,421 | 11/1904 | Griswold . |
| 846,239 | 3/1907 | Osborne ................ 74/594.2 |
| 1,053,150 | 2/1913 | Bouillat . |
| 3,312,139 | 4/1967 | Di Cristina . |
| 3,391,582 | 7/1968 | Polley, Jr. . |
| 4,113,395 | 9/1978 | Pawsat et al. . |
| 4,191,488 | 3/1980 | Bickerton .............. 74/594.1 |
| 4,259,880 | 4/1981 | Ueno . |
| 4,403,814 | 9/1983 | Koss et al. ............. 308/236 |
| 4,552,468 | 11/1985 | Hopper, Jr. ............ 384/458 |
| 4,642,075 | 2/1987 | Nagashima . |
| 4,704,919 | 11/1987 | Durham ................. 74/594.1 |
| 4,741,724 | 5/1988 | Wang . |
| 4,793,208 | 12/1988 | Bregnard et al. . |
| 4,794,815 | 1/1989 | Borromeo . |
| 5,015,013 | 5/1991 | Nadin . |
| 5,085,063 | 2/1992 | Van Dyke et al. . |
| 5,133,695 | 7/1992 | Kobayashi . |
| 5,186,068 | 2/1993 | Heller ..................... 74/425 |
| 5,197,349 | 3/1993 | Herman . |
| 5,201,242 | 4/1993 | Chi . |
| 5,201,243 | 4/1993 | Schneider . |
| 5,201,244 | 4/1993 | Stewart et al. . |
| 5,251,494 | 10/1993 | Edwards . |
| 5,267,485 | 12/1993 | Chi . |
| 5,330,302 | 7/1994 | Chen . |
| 5,426,997 | 6/1995 | Brion . |
| 5,493,937 | 2/1996 | Edwards . |
| 5,766,106 | 6/1998 | Edwards . |

FOREIGN PATENT DOCUMENTS

| | | |
|---|---|---|
| 2 237 111 | of 1975 | France . |
| 2 453 771 | of 1979 | France . |
| 2 531 026 | 2/1984 | France . |
| 200941 | of 1958 | Germany . |
| 25920 | of 1908 | Sweden . |

*Primary Examiner*—David M. Fenstermacher
*Attorney, Agent, or Firm*—Ladas & Parry

[57] ABSTRACT

A light-weight, strong and rigid rotatable spindle assembly utilizing a two-piece spindle suitable for employment in a variety of spindle applications, and in particular in a bicycle crankshaft assembly. Each spindle piece is integrally joined to a crank arm, and this joint, as well as the joint of the crank arm and the pedal tube, is reinforced with gussets. The two spindle pieces themselves are connected by means of a simple allen bolt within the interior of the bottom bracket shell, and this connection is thereby protected from the elements. As the two spindle pieces are pulled together by the allen bolt, they exert opposing forces on the inner race of a cartridge bearing, thereby fixing the lateral location of the spindle within the bottom bracket without exerting pre-load on the bearings. Proper alignment is easily accomplished by means of one or more spacers placed on either side of this inner race of the cartridge bearing. The two-piece spindle arrangement is also suitable for utilization in a bicycle wheel hub assembly or handlebar stem assembly.

20 Claims, 7 Drawing Sheets

ROTATABLE SPINDLE ASSEMBLY UTILIZING TWO-PIECE SPINDLE

CROSS REFERENCE TO RELATED APPLICATION

This is a Continuation-In-Part of U.S. application Ser. No. 08/109,966 filed Aug. 23, 1993, now U.S. Pat. No. 5,493,937 issued Feb. 27, 1996.

BACKGROUND OF THE INVENTION

1. Field of the Invention

This invention relates to rotatable spindle assemblies in general, and in particular for employment in a bicycle wheel hub, crank set, or handlebar stem. The rotatable spindle assembly is designed to be of minimal weight and maximal strength and rigidity, and to allow ease of assembly, adjustment, and disassembly.

2. Description of the Prior Art

There is much demand for light, rigid, and strong rotatable spindle assemblies for bicycles. For example, because the crankshaft assembly is z-shaped, and must be installed so that its center portion is located within a relatively narrow diameter hub (also known as the bottom bracket shell) of the frame of the bicycle, if a crankshaft assembly has no detachable joints but is constructed as a single piece, it must be shaped in a way which yields poor strength and rigidity relative to weight.

For this reason, higher quality crankshaft assemblies utilize detachable joints: they consist of two or three parts which are removably attached to form the complete assembly. Because joints are inherently the weakest point in a structure, including a crankshaft assembly (other things being equal), the location of the joints in a crankshaft assembly is critical to achieving the optimum relation of strength and rigidity to weight.

The typical three-piece crankshaft assemblies used in higher quality bicycles utilize two joints. The end of each crank arm opposite the pedal (the "pedal-opposite end" or "spindle end") is removably attached to an end of the shaft or spindle. Unfortunately however, the junction of the crank arm and spindle is the least desirable joint location for at least four reasons:

1. The junction of the crank arm and spindle is the point of highest stress and load in the crankshaft assembly.

2. To accommodate this great stress and load, the joints, including both the ends of the spindle and the pedal-opposite ends of the crank arms, require reinforcement through extra material which excessively increases the weight of the crankshaft assembly.

3. The necessity of enabling the pedal-opposite end of the crank arm and the end of the spindle to be separable or detachable, and the design requirements of the joint to accommodate the great stress and load to which it is subjected, prevent both the spindle and the crank arms from being shaped in the way that best maximizes their strength and rigidity while minimizing their weight.

4. Finally, at this location, the joints are especially subject to the elements and therefore prone to corrosion.

To lessen these disadvantages, several two-piece crankshaft assemblies have recently been introduced. In these designs, the pedal-opposite end of one crank arm is permanently attached to one end of the spindle, usually by welding, while the pedal-opposite end of the other crank arm is removably attached to the other end of the spindle. Durham, U.S. Pat. No. 4,704,919 (1987) and Groth, Swedish Pat. No. 25920 disclose such designs. These designs reduce the disadvantageous effects of the three-piece design, since on one side of the assembly the separable junction or joint between the pedal-opposite end of the crank arm and the spindle end is eliminated. However, on the other side of the assembly, the conventional separable junction location, with its disadvantages, is still utilized.

Two-piece assemblies in the early art disclosed by Ludlow and Taylor, U.S. Pat. No. 648,077 (1900); Scott, U.S. Pat. No. 627,597 (1899); Annable, U.S. Pat. No. 622,644 (1899); and Jerome, U.S. Pat. No. 623,373 (1899) avoid use of the conventional crank arm/spindle junctions. Instead, each crank arm is integrally connected to an axle or spindle portion, and the two spindle portions are removably joined. One spindle portion is solid, extends all or part way through the bottom bracket shell, and terminates in a solid, threaded stud. The other spindle portion consists of a hollow sleeve which fits over the solid spindle portion. The two spindle portions are joined by means of a nut tightened onto the threaded stud of the solid spindle portion and butting against a shoulder of the hollow spindle portion. Other examples of similarly constructed two-piece spindles are found in U.S. Pat. No. 846,239 by Osborne and U.S. Pat. No. 650,412 by McLellan.

However, because of the first crank arm's solid axle portion with its solid threaded stud, and because of the large amount of overlap between the two axle portions, assemblies constructed according to some of these designs were excessively heavy and appear to be completely out of use in recent times.

Previously, neither one-piece, two-piece nor three-piece crankshaft assemblies have achieved the optimum relation in the crank arms between strength and rigidity on the one hand, and lightness on the other hand. As discussed above, in three and some two-piece designs, this is in part caused by choosing to conventionally detachably join the crank arm to the spindle. But even where one or both crank arms are integrally connected with the corresponding ends of the spindle, this optimum relation has not been achieved. Relatively great forces are exerted at both the pedal and the spindle ends of the crank arms, and the previous means of reinforcing these ends in order to dissipate or transfer these forces add an unnecessarily large amount of weight.

In virtually all known previous crankshaft assemblies, one-piece, two-piece, and three-piece, lateral adjustment of the assembly, including the sprocket or sprockets, and sometimes also the elimination of play in the axle, are accomplished in manners which exert inward force on the outer portions of the bearings. For example, in Durham, lateral adjustment of the sprocket is accomplished through spacers or washers inserted on the spindle between the crank arms and the bearings. In conventional designs, elimination of axle play and any allowable lateral adjustment are accomplished by tightening one or both of the outer races against the bearings. As a result, in all of these assemblies, the bearings are subject to axially directed pre-load. A few designs eliminate this pre-load by adding a means of exerting a compensating outward force on the inward portions of the bearings. However, this entails additional weight. The remaining assemblies all experience pre-load, causing increased resistance and wear on the bearings.

In most two and three-piece crankshaft assemblies, some or all of the hardware which removably joins the various components, and in some cases this junction itself, is located outside of the bottom bracket compartment. This detracts from the clean, integrated appearance of the entire assembly, creates additional recesses and cavities which collect dirt and grime, and exposes this hardware to the elements, leaving it susceptible to corrosion and sticking or "freezing."

A final disadvantage of most two and three-piece crankshaft assemblies is that at least one, and often several, relatively expensive, specialized tools are required to install, adjust, and remove the crankshaft assembly.

Many of the above-noted problems with prior art spindle assemblies apply to other journalled assemblies of a bicycle, such as front and rear wheel hubs and handlebar stems. For example, common to all of these assemblies is the problem of pre-load on the bearings. The present invention is designed and configured to eliminate the aforementioned problems.

SUMMARY OF THE INVENTION

For convenience of presentation, this description will be specifically directed to a crankshaft assembly, since such an assembly experiences or exhibits all of the aforementioned problems of the prior art. It is to be understood, however, that the concepts and features of the present invention are, at least in part, applicable to bicycle wheel hub assemblies and handlebar stem assemblies in an analogous manner. In this connection, the term "spindle" as used herein shall mean "spindle" or "axle". Moreover, it will be clearly understood by one of ordinary skill in the arts of machine elements and mechanisms in a number of technologies that the invention is not limited to bicycle applications but is generic to any mechanical application involving rotatable spindle assemblies.

Accordingly, several objects and advantages of a crankshaft assembly, as representative, constructed in accordance with the invention are to provide a crankshaft assembly where:

a. each crank arm is integrally connected to the corresponding end of a two-piece spindle,
b. the detachable joint between the two spindle portions is preferably located within the bottom bracket between the bearings, and
c. the pedal and spindle ends of the crank arms are reinforced in a manner which maximizes their strength and rigidity with minimal additional weight;

thereby:

a. transferring the detachable joint of the various components of the crankshaft assembly from an area of high stress to an area of lower stress,
b. allowing both the spindle and the crank arms to be shaped and joined in the way that best maximizes their strength and rigidity while minimizing their weight;
c. enabling the crankshaft assembly to be easily and conveniently installed and removed with one common tool;
d. enabling the crankshaft assembly to be easily and conveniently adjusted to align the sprocket or sprockets with the chain line;
e. leaving the bearings free from any pre-load;
f. minimizing the hardware necessary to removably join the components of the crankshaft assembly;
g. enabling the junction of the various components, and the hardware for removably accomplishing this junction, to be hidden within the bottom bracket compartment, and protected from the elements; and
h. in some applications, enabling the hardware for removably joining the components of the crankshaft assembly to be, by design, totally within the bottom bracket compartment, partially within and partly outside the bottom bracket, or entirely outside the bottom bracket compartment.

As a broader, more universal aspect of the invention, there is provided a rotatable spindle assembly comprising: a housing having an axis and axially spaced lateral ends; a spindle rotatably mounted in the housing, the spindle comprising two separate spindle pieces; a spindle bearing secured within the housing adjacent one of the lateral ends of the housing, the spindle being supported for rotation in the bearing, the bearing comprising an inner race; and a coupling means for securely, yet removably, coupling the two spindle pieces together by drawing the spindle pieces toward one another to engage opposite sides of the inner race of the bearing.

Further additional objects and advantages will become apparent from a consideration of the ensuing description and drawings.

DETAILED DESCRIPTION OF THE PREFERRED EMBODIMENT

Figure 1:
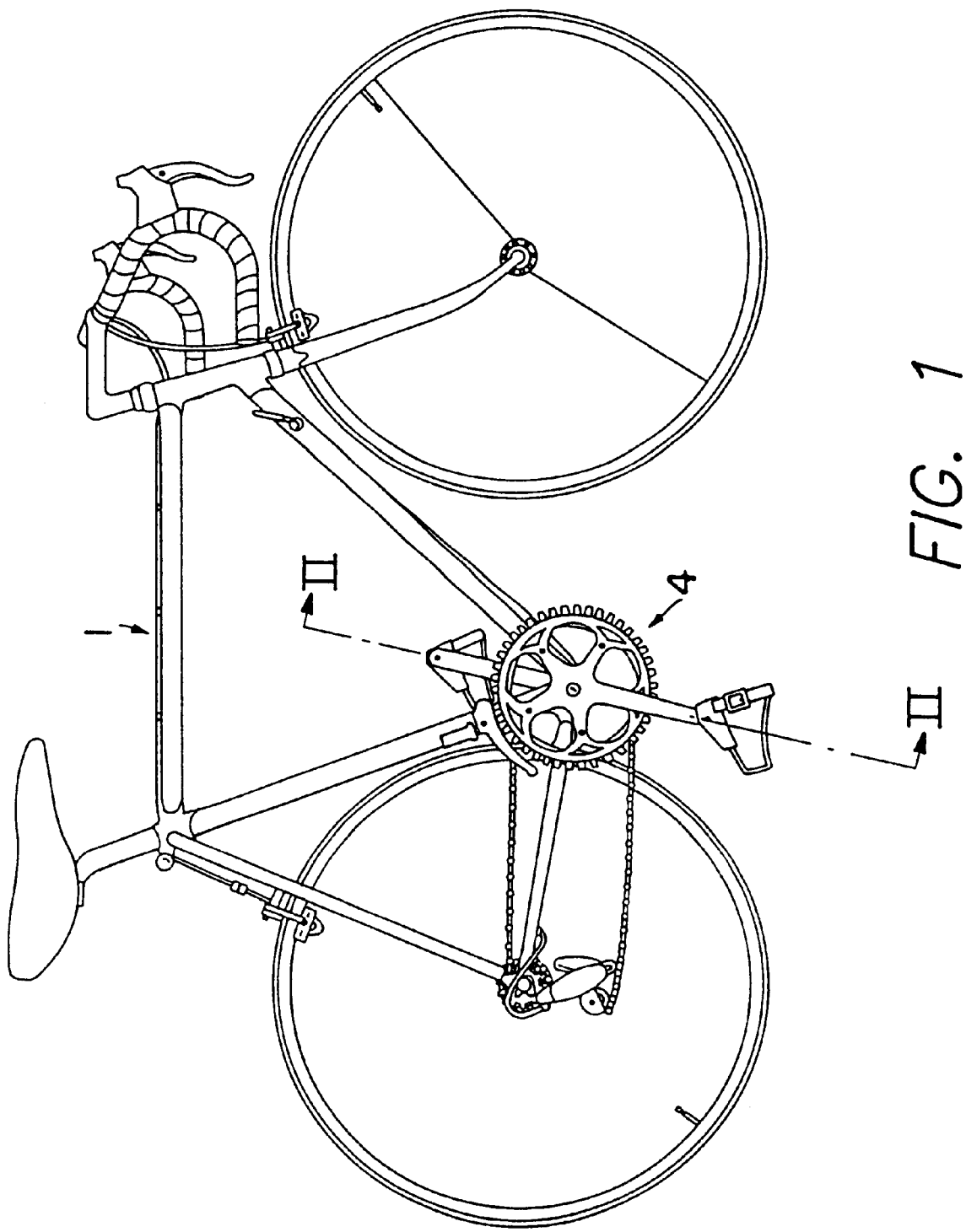
FIG. 1 shows, in side view, a bicycle, with a crankshaft assembly in accordance with the present invention.

FIG. 1 shows in side view, a bicycle (1), whose frame has a bottom bracket shell (2) [hidden in FIG. 1] which supports and acts as a hub for a crankshaft assembly (4), such as the one I have invented.

Figure 2:
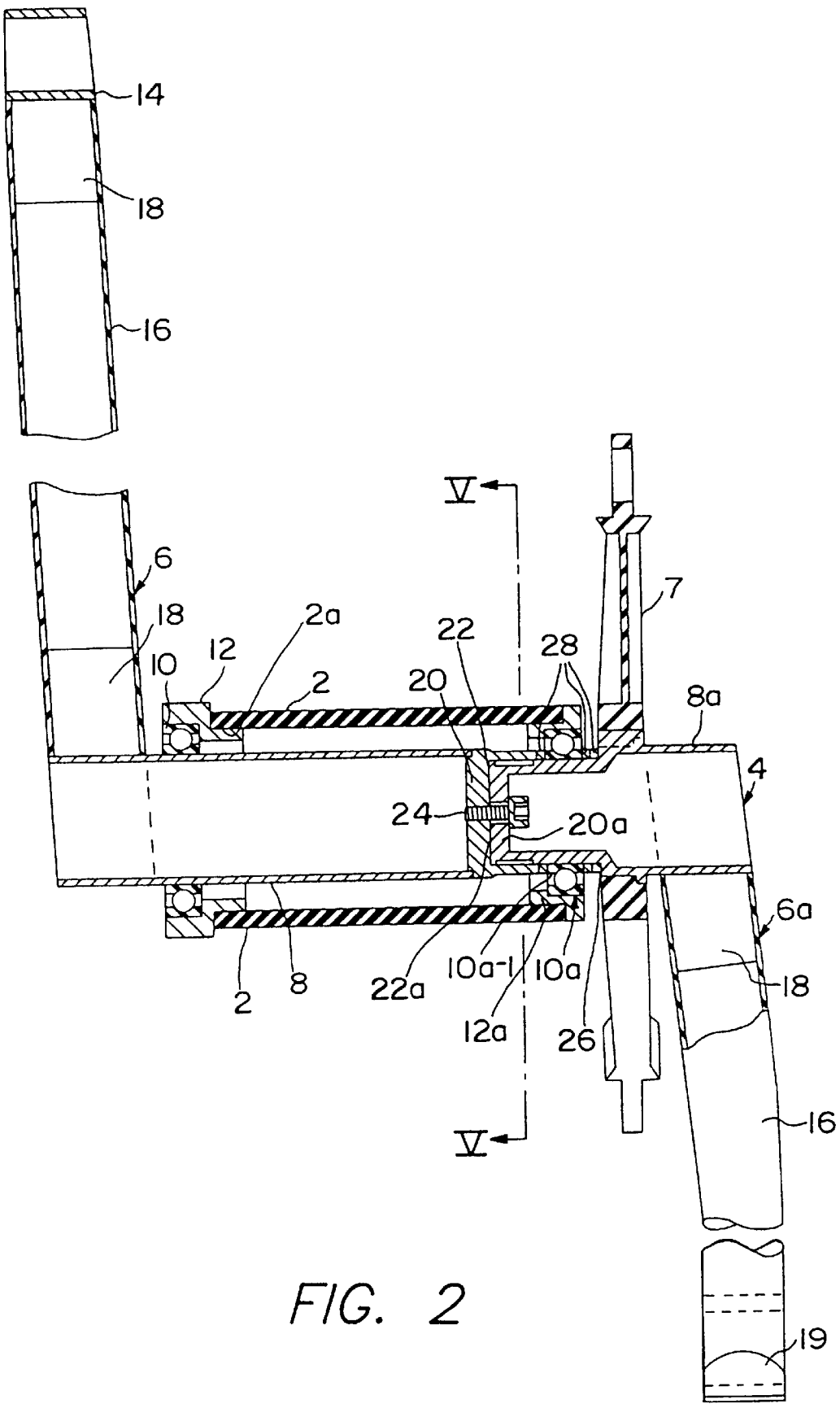
FIG. 2 is a cross-sectional view of entire crankshaft assembly taken along the line II—II in FIG. 1.

FIG. 2 shows a cross-sectional view of the crankshaft assembly I have invented. The crankshaft assembly (4) consists of a non-drive side crank arm and partial spindle piece (6), a drive side crank arm and partial spindle piece (6a), a spider (7) connected to the drive side crank arm and partial spindle piece and used to removably attach one or more sprockets or chain wheels (not shown), a means (described and referenced below) of coupling the spindle tubes (8 and 8a) of the two crank arm and partial spindle pieces (6 and 6a), a non-drive side cartridge bearing (10) and bearing cup (12), and a drive side cartridge bearing (10a) and bearing cup (12a).

Figure 3:
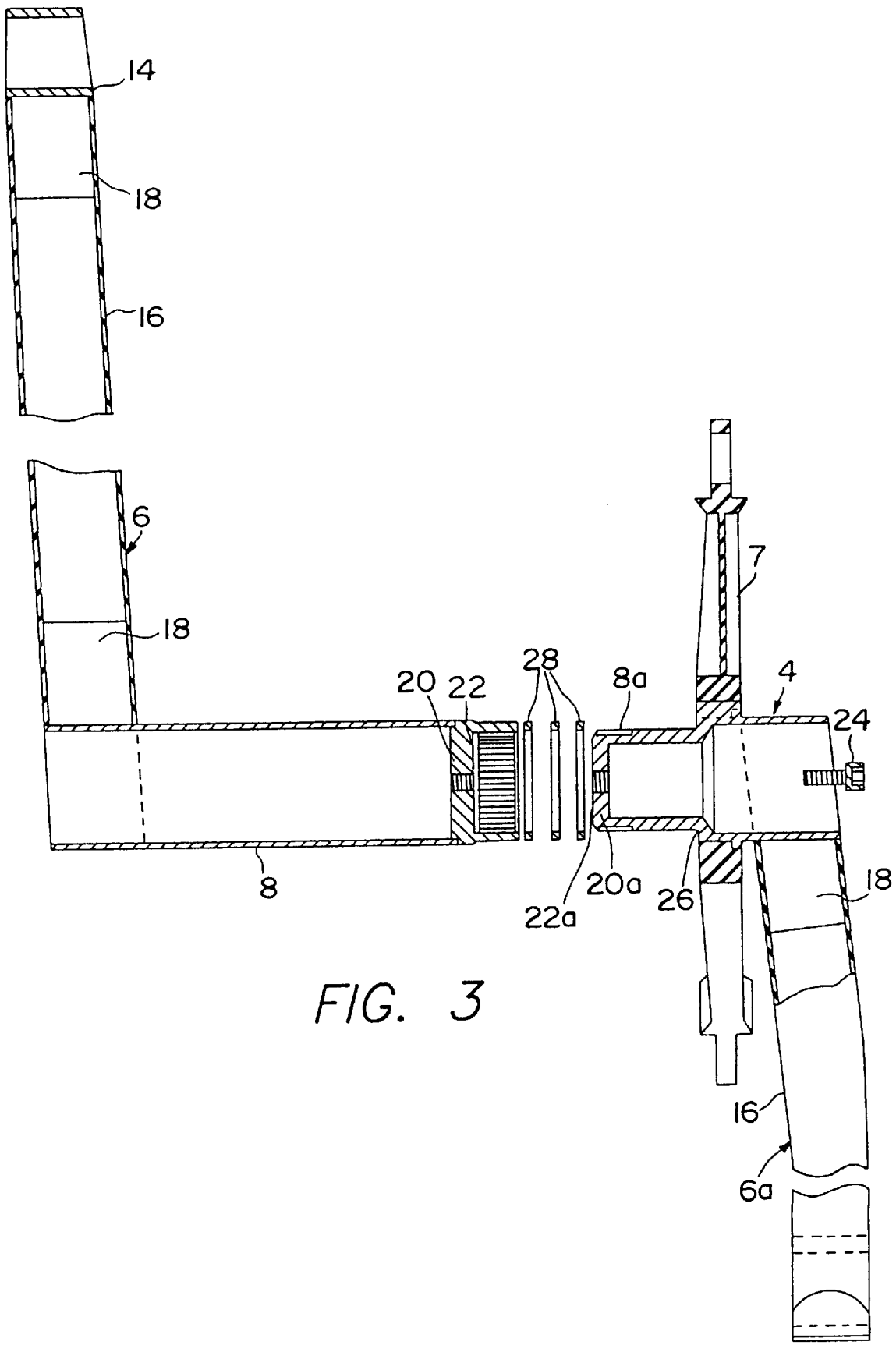
FIG. 3 is a cross-sectional view of both of the crank arm and spindle portions in same perspective as in FIG. 2, above, but not connected, and without any other structure shown.
Figure 4:
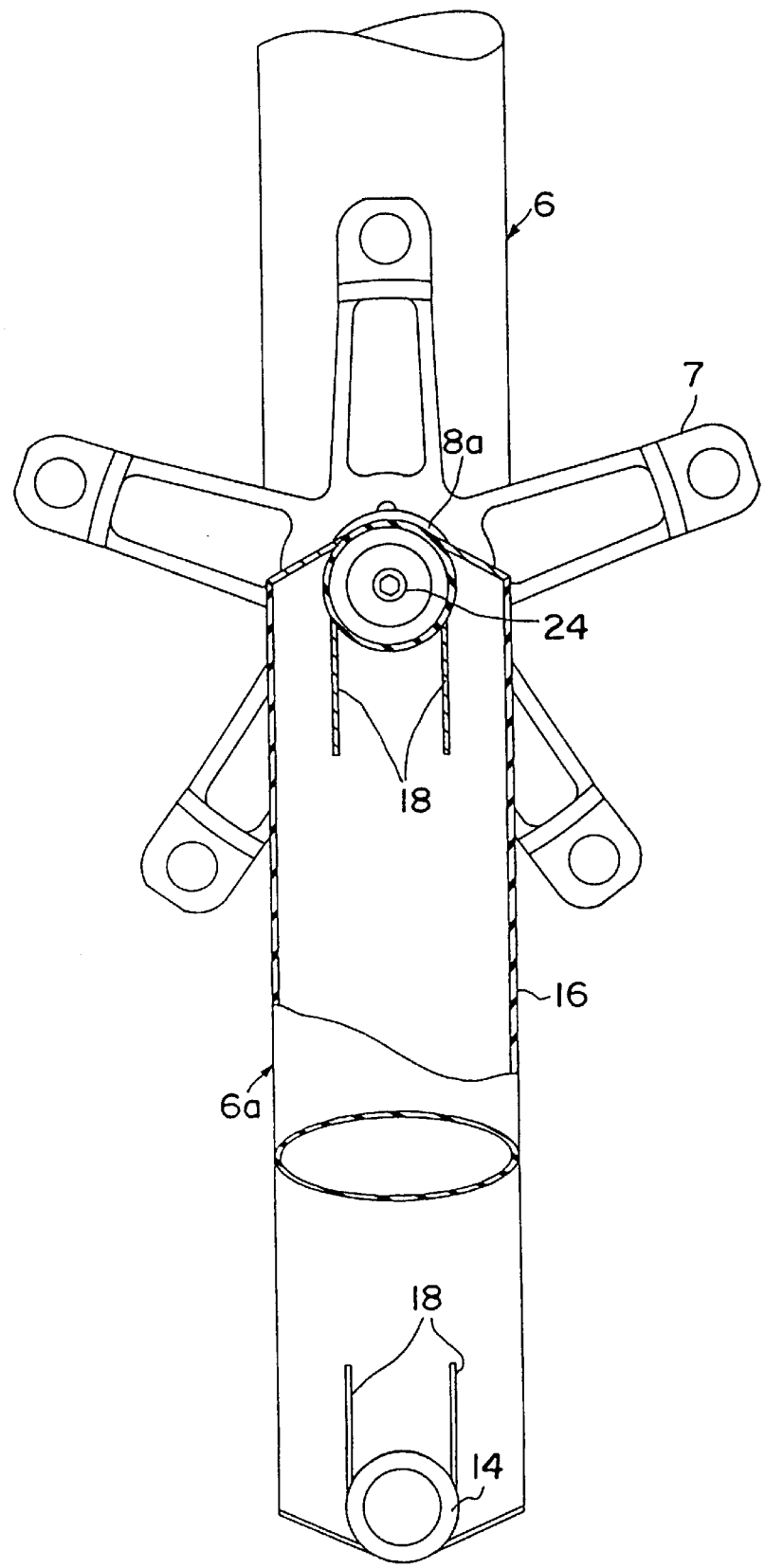
FIG. 4 is a partial right side view of the crank arms and spindle in the crankshaft region of the bicycle of FIG. 1.

As shown in FIGS. 2 and 3, in the preferred embodiment, the drive side and non-drive side crank arm and partial spindle pieces (6a and 6) each consist of a pedal tube (14), a crank arm tube (16) and a spindle tube (8 and 8a). The pedal tube (14) consists of a short steel tube, internally threaded to accept a conventional threaded pedal axle. As shown in FIGS. 2, 3 and 4, the pedal tube (14) is located and attached by welding within a bore at the outer, pedal end of the crank arm tube (16), with its axis or length parallel to the axis or length of the bottom bracket shell (2).

Referring to FIGS. 2 and 3, each spindle tube (8 and 8a) is made from thin-walled steel tubing. An outer end of each spindle tube (8 and 8a) is located and attached by welding within a bore at the spindle end of the crank arm tube (16), with the spindle tube's (8 and 8a) axis or length parallel to the axis or length of the bottom bracket, and the spindle tube (8 or 8a) extends inward from the crank arm tube (16) into the bottom bracket shell (2), where it is joined to the spindle tube (8a or 8) from the opposite crank arm and partial spindle piece (6a or 6).

Referring to FIGS. 2, 3 and 4, the crank arm tube (16) is also made from thin-walled steel tubing. The crank arm tube (16) circumference is elliptical; as shown in FIGS. 3 and 4, the crank arm tube (16) thus has a lesser width or diameter, and a greater width or diameter. As shown in FIGS. 2 and 3, the lesser diameter of the crank arm tube (16) runs approximately parallel to the axes of the pedal tube (14), the spindle tube (8 and 8a) and the bottom bracket shell (2), and is approximately equal in length to the length of the pedal tube (14). As shown in FIG. 4, the greater diameter of the crank arm tube (16) runs approximately perpendicular to the axes, and approximately parallel to the diameters, of the pedal tube (14), the spindle tube (8 and 8a) and the bottom bracket shell (2). The length of the greater diameter of the crank arm tube (16) significantly exceeds the diameters of both the pedal tube (14) and the spindle tube (8 and 8a). This elliptical shape of the crank arm tube (16) maximizes the crank arm tube's (16) ability to withstand the forces exerted upon it under pedalling load. As a result, a crank arm designed thus according to my invention is significantly stiffer and stronger, but also lighter, than a conventional crank arm.

Normally, where as described above, the width of the crank arm tube (16) significantly exceeds the diameters of the pedal tube (14) and the spindle tube (8 and 8a), the forces under pedalling load from the pedal tube (14) to the crank arm, here the crank arm tube (16), and from the crank arm to the spindle tube (8 and 8a), are high enough to cause local buckling and failure at these joints. This has prevented the use, in the prior art, of crank arms in elliptical, oval, or other shapes where both the crank arm's width exceeds the diameters of the pedal tube or spindle tube, and the crank arm is completely hollow or made from thin walled tubing. In the crankshaft assembly I have invented, the successful or structurally sound transfer of these forces is accomplished by means of internal gussets (18), and external caps (19).

The internal gussets (18) consist of flat plates, as shown in FIGS. 3 and 4. At the pedal end of the crank arm tube (16), these gussets (18) extend longitudinally from the pedal tube (14) a relatively short distance along the length of the crank arm tube (16), and latitudinally across the crank arm tube (16) on chords parallel to the crank arm tube's lesser diameter. Each gusset (18) is welded to all abutting surfaces, i.e. the two opposite walls of the crank arm tube (16) and an axis on the outer surface of the pedal tube (14). In the preferred embodiment, the pedal tube (14) is reinforced by two such gussets (18), and each spindle tube (8 and 8a) is also reinforced by two gussets (18) according to the same design.

As shown in FIGS. 2, 3, and 4, the external caps (19) consist of flat or slightly curved plates. These external caps (19) close the openings left in the crank arm tube (16) on both sides of the pedal tube (14) and of the spindle tube (8 and 8a), and are welded to the outer surface of either the pedal tube (14) or the spindle tube (8 and 8a), and to the exposed rim or end of the crank arm tube (16).

As shown in FIG. 2, each side of the bottom bracket shell (2) is internally threaded (at 2a) to accept externally threaded bearing cups, the drive side and non-drive side bearing cups (12a and 12). Each bearing cup (12a and 12) permanently holds one of the two cartridge bearings, the drive side and non-drive side cartridge bearings (10 and 10a). The spindle tube (8a) of the drive side crank arm and partial spindle piece (6a) has an outer diameter virtually equal to the inner diameter of the drive side cartridge bearing (10a), and slips, snugly, through the drive side cartridge bearing (10a) a relatively small distance into the bottom bracket shell (2). Similarly, the spindle tube (8) of the non-drive side crank arm and partial spindle piece (6) has an outer diameter virtually equal to the inner diameter of the non-drive side cartridge bearing (10), and slips, snugly, through the non-drive side cartridge bearing (10), extending through the bottom bracket shell (2) almost completely to the drive side cartridge bearing (10a).

However, as also shown in FIG. 2, the outer diameter of drive side spindle tube (8a), and the corresponding inner diameter of the drive side cartridge bearing (10a), are smaller than the outer diameter of non-drive side spindle tube (8), and the corresponding inner diameter of the non-drive side cartridge bearing (10). This allows an inner section of the drive side spindle tube (8a) to fit within an inner section of the non-drive side spindle tube (8).

Figure 5:
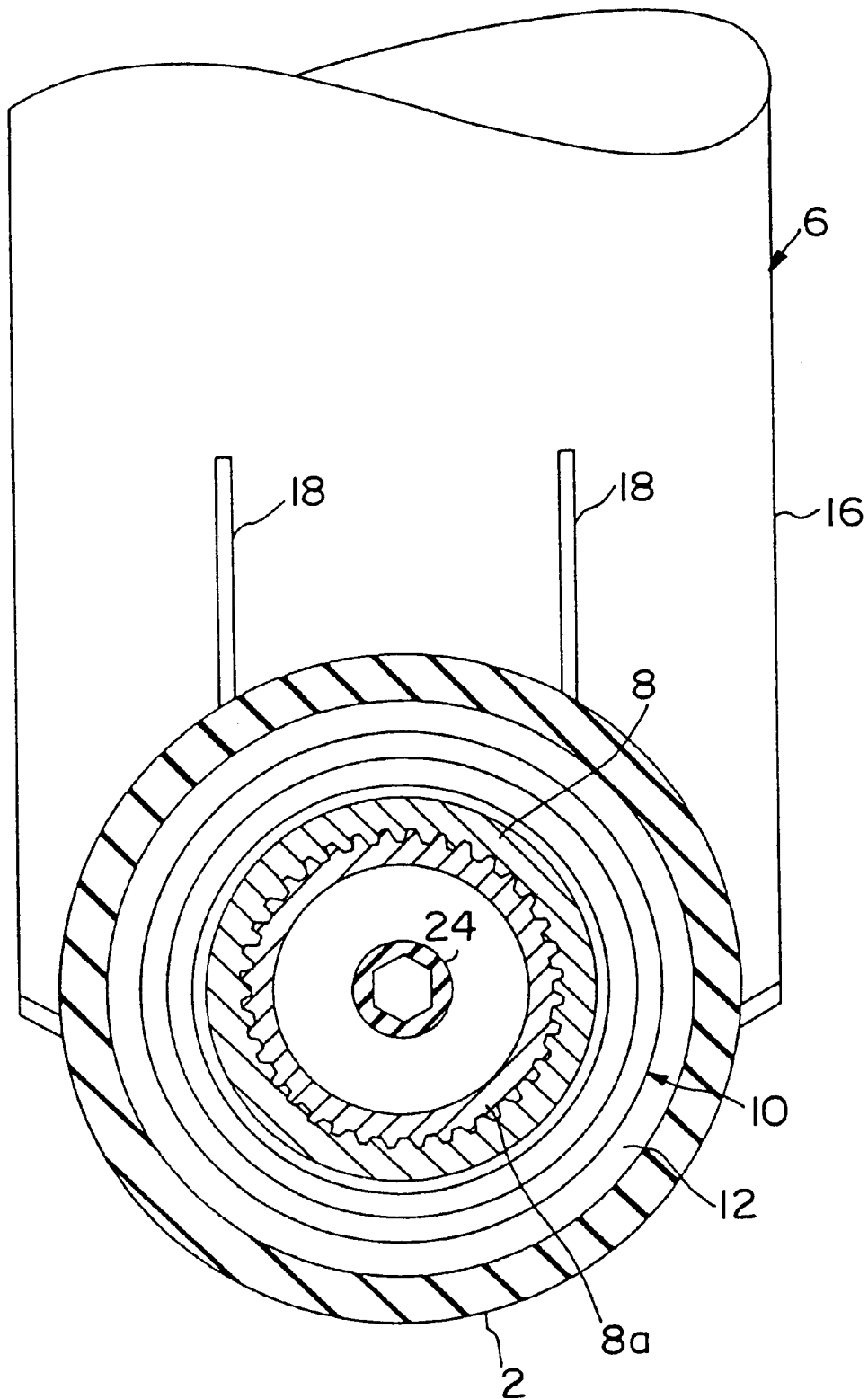
FIG. 5 is a cross-sectional view of the crankshaft assembly taken along the line V—V in FIG. 2.

As shown in FIG. 5, the inner section of the non-drive side spindle tube (8) is internally splined to correspond to external splines on the inner section of the drive side spindle tube (8a). These splines prevent relative rotation between the non-drive and drive side crank arm and partial spindle pieces (6 and 6a [not shown if FIG. 5]).

As shown in FIG. 2, a non-drive side blocking disc (20) with an internally threaded central bore, is welded close to, but not at, an inner end of the non-drive side spindle tube. A drive side blocking disc (20a) with a central bore is welded at an inner end of the drive side spindle tube. A threaded shaft of a conventional allen-head bolt (24) passes through the drive side blocking disc (20a) and is threaded into the non-drive side blocking disc (20) to removably and securely join the non-drive and drive side crank arm and partial spindle pieces (6 and 6a).

Thus, the detachable joint connecting the non-drive and drive side crank arm and partial spindle pieces (6 and 6a), and the entire means of accomplishing this joint, are located within the bottom bracket shell (2), between and interior to the non-drive side bearing cup (12) and non-drive side cartridge bearing (10) on the one hand, and the drive side bearing cup (12a) and the drive side cartridge bearing, on the other hand. This unique feature, alone or in conjunction with other features described here, makes possible all the advantages of my invention: It locates the detachable joint of the various components of the crankshaft at an area of low stress, protected from the elements; it allows the spindle and the crank arms to be integrally joined and to be shaped in the way that best maximizes their strength and rigidity while minimizing their weight; it makes the crankshaft assembly easy to install, adjust and remove with just one tool, a common allen wrench, and just one common allen-head bolt; and, as described below, it leaves the bearings free from any preload.

As shown in FIG. 2, a drive side shoulder (26) is provided on the drive side spindle tube (8a) a short distance outward from the drive side cartridge bearing (10a). Since, as described above, the inner end of the non-drive side spindle tube (8) has an outer diameter greater than the inner diameter of the drive side cartridge bearing (10a) and extends almost completely to the drive side cartridge bearing (10a), the inner end of the non-drive side spindle tube (8) thus functions as a shoulder on the inward side of the drive side cartridge bearing (10a). Alignment of the crankshaft assembly (4) with the chain line is thus easily accomplished by means of alignment spacers or washers (28) placed on the drive side spindle tube (8a), on either or both sides of the drive side cartridge bearing (10a). Alignment washers (28) placed between the drive side shoulder (26) and the drive side cartridge bearing (10a) will pull the crankshaft assembly (4), and any sprocket or sprockets mounted on the crankshaft assembly (4) outward, away from the bottom bracket shell (2), until the inner end of the non-drive side spindle tube (8) contacts the drive side cartridge bearing (10a). Alignment washers (28) placed between the inner end of the non-drive side spindle tube (8) and the drive side cartridge bearing (10a) will pull the crankshaft assembly (4) and any sprocket or sprockets the opposite direction, until the drive side shoulder (26) contacts the drive side cartridge bearing (10a). Furthermore, if necessary, the relative width of the crankshaft assembly (4) can be increased by placing alignment washers (28) between the drive side and non-drive side blocking discs (20 and 20a).

In the preferred embodiment, as shown in FIG. 2, the outer diameters of the alignment washers (28), the drive side shoulder (26), and the inner end of the non-drive side spindle tube, will not exceed the outer diameter of an inner race (10a-1) of the drive side cartridge bearing (10a). Because alignment of the entire crankshaft assembly (4) will thus be fixed by means of outward and inward forces on just an inner race (shown here as 10a-1) of one cartridge bearing, the bearings will be free from any preload.

Figure 6:
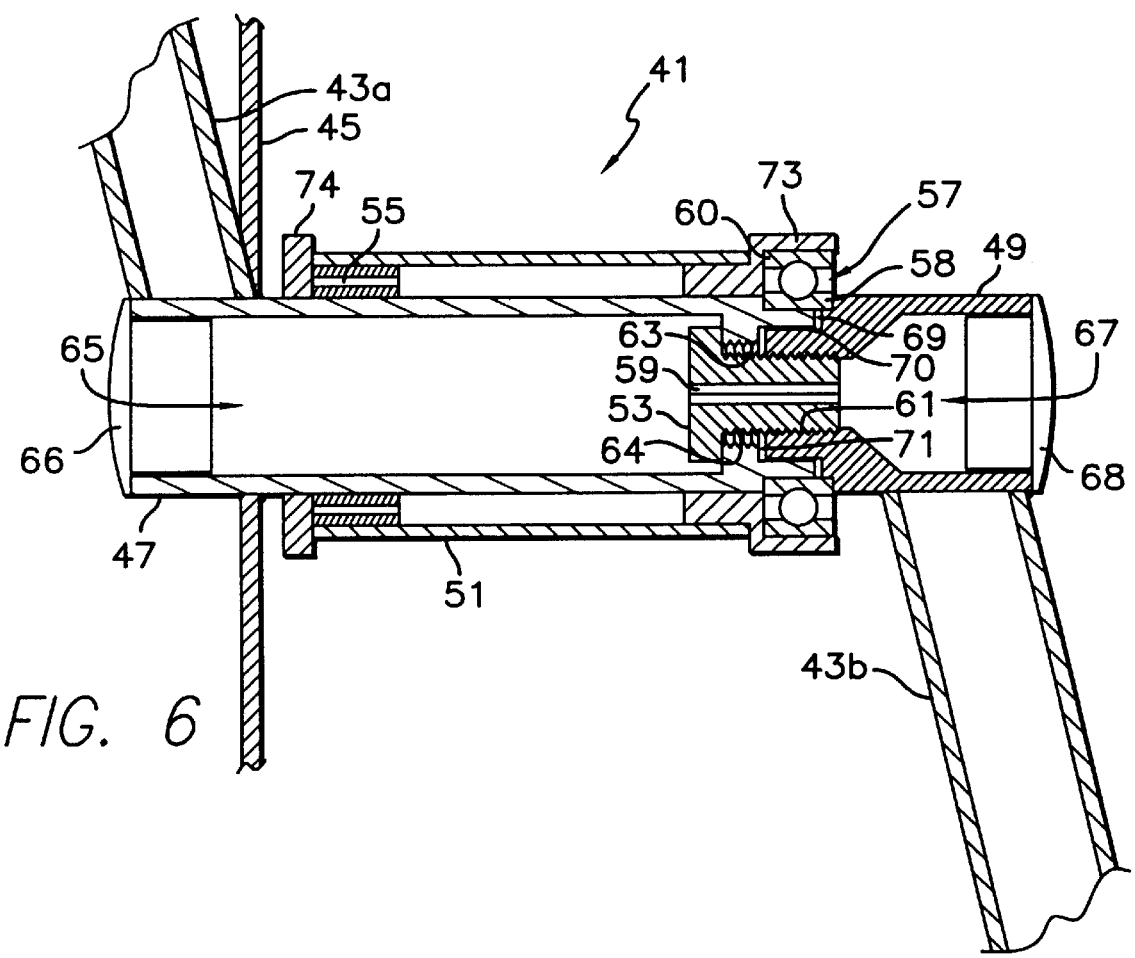
FIG. 6 is a cross-sectional view of a crankshaft assembly employing an alternate embodiment of a two-piece spindle wherein the coupling device for connecting the two spindle pieces is located entirely within the housing shell.

In FIG. 6, an alternative embodiment of a two-piece spindle assembly 41 is depicted. In this figure, and in FIGS. 7 and 8, the spindle assembly is employed in a crank set, although it should be understood that the spindle assembly itself can be employed in any journalled portion of a mechanical system, and the embodiments shown and described in this specification exemplify the use of the invention in the journalled portions of a bicycle.

Returning again specifically to FIG. 6, a first crank arm 43b and a spider 45 are fixed, as by welding, to a first spindle or axle piece 47, while the other crank arm 43b is fixed, as by welding, to the second spindle or axle piece 49. The two axle pieces 47 and 49 are joined together by bolt 53 accessible through the hollow interior 65 of the first spindle piece 47. Since a hex driver receptacle 59 passes completely through bolt 53, access to the bolt 53 for fastening and unfastening the two spindle pieces 47, 49 together is also possible through the hollow access opening 67 in the second spindle piece 49.

The two-piece spindle assembly 47, 49 is journalled in bottom bracket shell 51 having a bracket shell end cap 74 at one end of the bottom bracket shell 51, and a bearing cap 73 fixed to the bottom bracket shell 51 at the other end.

A first bearing 57 may be a standard cartridge bearing having a series of balls captured between inner and outer races, while the second bearing 55 can be of a standard cartridge ball bearing arrangement or in the form of roller bearings as depicted in FIG. 6. The type of bearing employed as the second bearing 55 is a matter of choice by the bicycle builder, but the first bearing 57 is preferably one which has an outer race 60 pressure fitted to the interior of bearing cup 73, and an inner race 58 having lateral sides against which the facing ends of spindle pieces 47 and 49 engage in order to support the two-piece spindle 47, 49 within the bottom bracket shell 51 without axial movement.

In order to assure that the facing ends of spindle pieces 47 and 49 securely engage the opposite sides of inner race 58 by the tightening of bolt 53, gaps 69 and 71 are provided.

In order to keep the two spindle pieces 47 and 49 from rotating with respect to one another, and so as not to rely upon the frictional engagement of the two spindle pieces 47, 49 against the inner race 58, a male/female spline arrangement 70 may be employed as is shown in FIGS. 3 and 5. Obviously, other types of keyed connections between the inner facing ends of spindle pieces 47, 49 can be employed in place of a splined connection.

As will be observed by reference to FIG. 6, the entire coupling arrangement for joining the inwardly facing ends of spindle pieces 47 and 49 is located entirely within the bottom bracket shell housing 51 between the two bearings 55, 57. In this manner, maximum protection from the environment is realized for the spindle coupling means.

Since the machining of the two spindle pieces 47, 49 at their coupling region is done with precision, it may be difficult to separate the two spindle pieces 47, 49 after bolt 53 is removed, especially after the two-piece axle assembly has been assembled for a long time. To assist in pushing the two spindle pieces 47, 49 apart, a secondary set of internal threads 63 is provided near the free end of the first spindle piece 47. After bolt 53 is fully removed from the assembly, a larger diameter removal bolt (not shown) may be threaded into the internal threads 63, and upon screwing the bolt further into the internal threads 63, the end of the bolt will contact the facing end of spindle piece 49 and push spindle piece 49 away from the end of spindle piece 47. After a few turns of the removal bolt, the two pieces can be easily separated.

To keep the inner hollow portions of the two spindle pieces 47, 49 environmentally protected, end caps 66 and 68, preferably made of plastic material, can be fitted into the outwardly facing ends of spindle pieces 47 and 49 using and interference fit and/or provided with a detent/groove arrangement (not shown).

Figure 7:
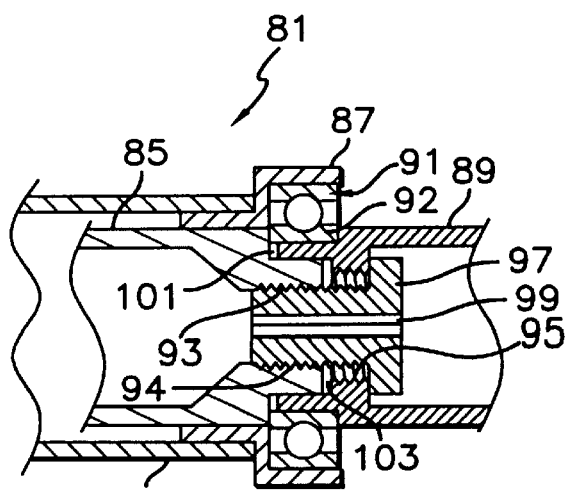
FIG. 7 is a cross-sectional partial view of a crankshaft assembly employing an alternate embodiment of a two-piece spindle wherein the coupling device for connecting the two spindle pieces is located partly within and partly outside the housing shell.

FIG. 7 shows a two-piece spindle assembly 81. Spindle assembly 81 is an alternative embodiment to that depicted in FIG. 6 and shows an arrangement of the inner and outer spindle pieces 85, 89 joined together by bolt 97 having a hex driver receptacle 99 by which bolt 97 is tightened or loosened by the mutual engagement of the internal threads 93 of spindle piece 85 and the external threads 94 of the bolt 97. Components similar in location and operation as those described in connection with FIG. 6 are bearing cup 87, cartridge bearing 91 having an inner race 92, a bottom bracket shell 83, gaps 101 and 103, and internal secondary threads 95 for insertion of a large diameter removal bolt for purposes of disassembling the two-piece spindle. In FIG. 7, however, it will be noted that the coupling means for joining the two spindle pieces 85, 89 is located partially inside of the bottom bracket shell housing 83 and partially outside of it adjacent one of the ends of the bottom bracket shell housing 83.

Figure 8:
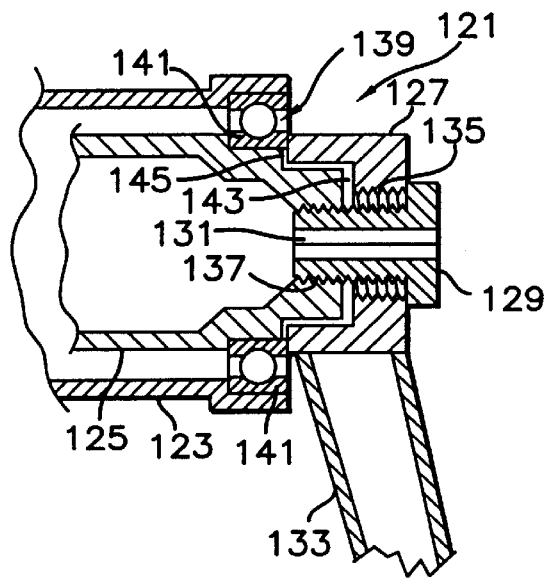
FIG. 8 is a cross-sectional partial view of a crankshaft assembly employing an alternate embodiment of a two-piece spindle wherein the coupling device for connecting the two spindle pieces is located entirely outside the housing shell.

In FIG. 8, yet a further alternative embodiment of a two-piece spindle assembly 121 made in accordance with the invention is depicted, wherein a first spindle piece 125 and a second spindle piece 127 are bolted together by bolt 129 having external threads 137 for threading into the end of spindle piece 125. Similar mechanical components to those discussed in connection with FIGS. 6 and 7 are shown in FIG. 8, namely, crank arm 133, secondary internal threads 135, cartridge bearing 139 having an inner race 141, and gaps 143 and 145. The significant difference between the embodiment of FIG. 8 as compared with those of FIGS. 6 and 7 is that, in FIG. 8, the coupling means for joining the two spindle pieces 125, 127 together is located entirely outside of the bottom bracket shell housing 123, i.e. outside the bearing 139.

Figure 9:
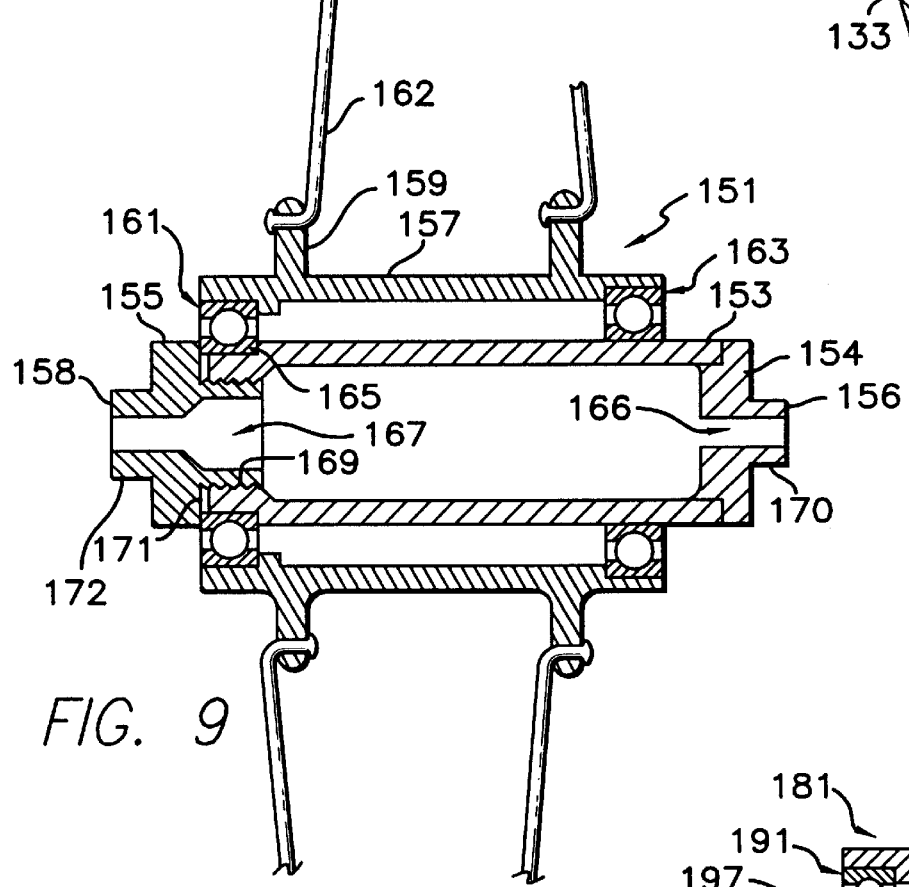
FIG. 9 is a cross-sectional view of a wheel hub assembly constructed to employ the two-piece spindle assembly according to the present invention.

FIG. 9 shows an arrangement of a bicycle wheel hub assembly 151 employing the concepts of the present invention, i.e. the provision of a two-piece spindle 153, 155. The first and second spindle pieces 153, 155 may be formed to accommodate an axle (not shown) in passageways 166, 167, the axle then being used to mount the wheel on a bicycle frame in conventional fashion with the frame of the bicycle fork (not shown) being clamped between the nut (not shown) for the axle and the free ends 156, 158 of the first and second spindle pieces 153, 155, respectively. For ease of manufacture, the first spindle piece 153 may, itself, be of two parts, one part which joins with the second spindle piece 155 and a second part functioning as an end cap 154 which provides support for the spindle on an axle (not shown) passing through passageway 168.

The wheel hub shell 157 is shown to have spoke flanges 159 for the anchoring of a number of spokes 162. First and second bearings 163 and 161 are shown to be of a cartridge type bearing, the second bearing 161 having an inner race 165 against which the two spindle pieces 155 and 153 are pressed into engagement by relative turning of the first spindle piece 153 and the second spindle piece 155, pulling the two spindle pieces together against opposite sides of inner race 165 of bearing 161 due to the threaded connection 169. A hex outer surface 170, 172 of the first and second spindle pieces 153, 155 will accommodate a wrench for purposes of tightening and untightening the two spindle pieces 153, 155 together against the inner race 165 of bearing 161.

As with the other arrangements previously described, a gap 171 is provided so that the two spindle pieces 153, 155 will be ensured to tightly engage the opposite sides of inner race 165 of bearing 161.

Figure 10:
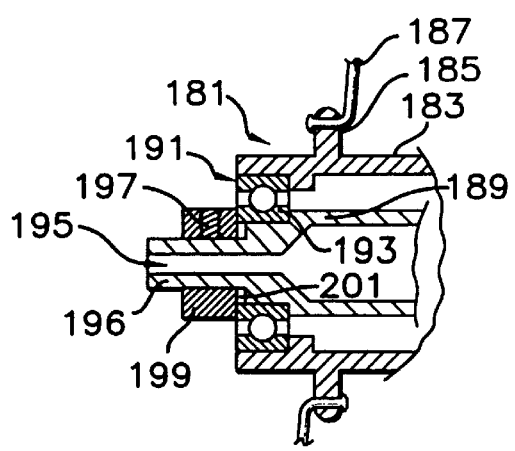
FIG. 10 is a cross-sectional partial view of a further alternate embodiment of a two-piece wheel hub spindle assembly comprising an extended spindle piece passing through the housing shell, and an adjustable stop positionable along an external end of the extended spindle piece.

FIG. 10 shows a simpler version of a bicycle wheel hub assembly 181 which has a hub shell 183 with spoke flanges 185 for the connection of a number of spokes 187. A first spindle piece 189, which has a right-hand end similar to that shown in FIG. 9, has a left-hand end portion 196 which projects significantly outwardly of the hub shell 181 so that the second spindle piece, in the form of a collar 199, can be slipped onto the end 196, and a set screw 197 can be tightened so that the two spindle pieces 189, 199 will engage the opposite ends of inner race 193 of bearing 191. The protruding end 196 of the first spindle piece 189 may have a flattened surface for engagement of set screw 197, or it may be square or hexagonal in its formation to accommodate the easy and reliable setting of set screw 197.

While the arrangement of the wheel hub assembly in FIG. 10 would not be suitable for a crank set function (because it would not accommodate the stress due to the applied torque), the set screw arrangement should provide adequate and secure coupling of the two spindle pieces 189, 199 in a wheel hub assembly. Without any need to accommodate applied torque, the main function of the set screw connection between the two spindle pieces 189, 199 is to prevent axial play in the spindle relative to the hub shell 183.

Conclusion, Ramifications, and Scope

Thus, the reader will see that this invention discloses a rotatable spindle assembly which achieves the optimum relation between strength and rigidity on the one hand and lightness on the other, which is easily and conveniently installed, removed and adjusted, whose bearings are not subject to any pre-load, and in which the hardware for removably joining the separate sections, and the joint itself, is optionally hidden within the bottom bracket compartment, and protected from the elements.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed. For example, the thin-walled tubing described need not be of steel, but could be of other strong, light-weight materials such as titanium or carbon fiber. As another example, the inner section of the non-drive side crankshaft spindle tube, by virtue of its internal splines and blocking disc, described above, functions as a cup to accept the inner end of the drive side spindle tube. This cup function need not be performed by the inner end of the non-drive side spindle tube itself. Instead, a separate cup performing the same function could be welded onto the end of the non-drive side spindle tube. As yet a further example, the two-piece spindle segments need not necessarily engage opposite sides of the inner race of a bearing. A shaft may be held fixed in position without rotation, and a standard cartridge or thrust bearing may be press fitted or otherwise secured to the shaft. An external rotatable two-piece spindle may then engage the outer race of the bearing. The preferred embodiment of the two-piece spindle engaging the inner race is therefore to be considered exemplary only. As a final example, while a simple and direct way of joining the two spindle pieces together within the housing shell and between the bearing assemblies has been described, other means of accomplishing this joint in the same area are possible.

In the wheel hub assemblies, shown by way of example in FIGS. 9 and 10, it will be evident that no substantial rotational stress or load is exerted on the spindle as in the case of a crankshaft assembly. This permits alternate designs which need not account for heavy rotational stresses or loads as exemplified by the set-screw arrangement of FIG. 10. Other similar or analogous attaching techniques obviously could be employed.

The above description and drawing relate to crank sets and wheel hubs employing the two-piece spindle assembly according to the invention. Further examples employing the invention in a handlebar stem arrangement or in non-bicycle applications would thus be apparent to the skilled mechanic, so that illustrations and depictions of such other applications are not necessary.

Accordingly, the scope of the invention should be determined not by the embodiments illustrated, but by the appended claims and their legal equivalents.

I claim:

1. A rotatable spindle assembly comprising:
   a housing having an axis and axially spaced lateral ends;
   a spindle rotatably mounted in said housing, said spindle comprising two separate spindle pieces;
   a spindle bearing secured within said housing, said spindle being supported for rotation by said bearing; and a coupling means for securely, yet removably, coupling said two spindle pieces together by drawing said spindle pieces toward one another to engage opposite sides of said bearing; and wherein:

said spindle bearing comprises an inner race;

each of said spindle pieces comprises a shoulder; and said coupling means is adapted to draw said shoulders toward one another to engage opposite sides of said inner race of said spindle bearing without imparting any pre-load to said bearing.

2. The rotatable spindle assembly as claimed in claim 1, comprising:

means for supporting said spindle bearing adjacent one of said lateral ends of said housing; and a second spindle bearing secured within said housing adjacent the other of said lateral ends of said housing, said spindle being supported for rotation in both said first and second spindle bearings.

3. The rotatable spindle assembly as claimed in claim 1, wherein said coupling means is located entirely within said housing between said housing lateral ends.

4. A rotatable spindle assembly as claimed in claim 3, comprising at least one space for placement against said inner race and between said shoulders.

5. The rotatable spindle assembly as claimed in claim 1, wherein said coupling means is located entirely outside of said housing adjacent one of said housing lateral ends.

6. A rotatable spindle assembly as claimed in claim 5, comprising at least one space for placement against said inner race and between said shoulders.

7. In combination, a rotatable spindle assembly as claimed in claim 1 and a bicycle wheel hub assembly having wheel spoke attachment means and an axle for mounting said bicycle wheel hub assembly to a bicycle frame, and wherein:

said housing defines a cylindrical wheel hub shell for said wheel hub assembly, said wheel hub shell carrying said wheel spoke attachment means; and said spindle defines a two-piece wheel hub spindle having an axial passageway therethrough to receive said axle.

8. The rotatable spindle assembly as claimed in claim 1, comprising at least one spacer for placement against said inner race and between said shoulders.

9. In combination, a rotatable spindle assembly as claimed in claim 1 and a bicycle crank set having first and second crank arms, wherein:

said housing defines a cylindrical bracket shell for said crank set; and said spindle defines a crank set spindle, said first crank arm being fixed to one of said spindle pieces, and said second crank arm being fixed to the other of said spindle pieces.

10. The bicycle crankshaft assembly as claimed in claim 9, wherein said axially engageable surfaces on said first and second spindle segments are located so as to apply inwardly and outwardly directed forces, respectively, on said second bearing without imparting any pre-load to said second bearing.

11. A rotatable spindle assembly as claimed in claim 10, comprising at least one space for placement against said inner race and between said shoulders.

12. The bicycle crankshaft comprising:

a cylindrical bracket shell having a central axis and first and second axial ends;

first and second crank arms;

a spindle comprising first and second spindle segments, said first crank arm being fixed to said first spindle segment and said second crank arm being fixed to said second spindle segment, and connecting means for securely connecting said first and second spindle segments together; and first and second bearings, said first bearing being secured adjacent said shell first axial end, and said seocnd bearing being secured adjacent said shell second axial end, said second bearing having a side directed inwardlyof said shell and a side directed outwardly of said shell; and wherein:

said first spindle segment is journalled in said first bearing and has an engageable surface axially directed toward and adjacent said inwardly directed side of said second bearing;

said axially engageable surfaces of said first and second spindle segments engage and fix said second bearing therebetween to restrict axial movement of said spinsle within said shell.

13. The bicycle crankshaft assembly as claimed in claim 9, wherein said axially engageable surfaces on said first and second spindle segments are located so as to apply inwardly and outwardly directed forces, respectively, on said second bearing without imparting any pre-load to said second bearing.

14. The bicycle crankshaft assembly as claimed in claim 13, comprising at least one spacer for placement against said inner race and between said axially engageable surfaces of said first and second spindle segments.

15. The bicycle crankshaft assembly as claimed in claim 13, wherein said attachment means is located entirely within said cylindrical bracket shell.

16. A bicycle crankshaft assembly comprising: a cylindrical bracket shell having a central axis and first and second axial ends;

first and second crank arms;

a spindle journalled in said shell and comprising first and second spindle segments, said first crank arm being fixed to said first spindle segment and said second crank arm being fixed to said second spindle segment; and connecting means for securely connecting said first and second spindle segment together; and a spindle fixing means for restricting axial movement of said spindle relative to said shell, said spindle fixing means comprising a bearing secured to said shell coaxially thereof, and respective axially directed engageable surfaces on said first and second spindle segments engaging and fixing said bearing therebetween, wherein said axially directed engageable surfaces on said first and second spindle segments are located so as to apply inwardly and outwardly directed forces, respectively on said bearing without imparting any pre-load to said bearing, said bearing comprising inner and outer races, said axially engageable surfaces of said first and second spindle segments being located adjacent opposite sides of said inner race.

17. The bicycle crankshaft assembly as claimed in claim 16, comprising at least one spacer for placement against said inner race and between said axially engageable surfaces of said first and second spindle segments.

18. The bicycle crankshaft assembly as claimed in claim 16, wherein said attachment means is located entirely outside said cylindrical bracket shell.

19. The bicycle crankshaft assembly as claimed in claim 16, wherein said attachment means is located partly within and partly outside said cylindrical bracket shell.

20. The bicycle crankshaft assembly as claimed in claim 16, wherein said attachment means is located entirely outside said cylindrical bracket shell.

* * * * *